(12) United States Patent
Otsu et al.

(10) Patent No.: US 7,957,560 B2
(45) Date of Patent: Jun. 7, 2011

(54) UNUSUAL ACTION DETECTOR AND ABNORMAL ACTION DETECTING METHOD

(75) Inventors: Nobuyuki Otsu, Tsukuba (JP); Takuya Nanri, Tokyo (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 962 days.

(21) Appl. No.: 11/808,827

(22) Filed: Jun. 13, 2007

(65) Prior Publication Data
US 2007/0291991 A1 Dec. 20, 2007

(30) Foreign Application Priority Data

Jun. 16, 2006 (JP) ................................. 2006-167721

(51) Int. Cl.
G06K 9/00 (2006.01)
(52) U.S. Cl. .......................... 382/104; 382/103; 382/181
(58) Field of Classification Search .................. 382/103, 382/104, 181
See application file for complete search history.

(56) References Cited

U.S. PATENT DOCUMENTS

| | | | |
|---|---|---|---|
| 5,442,716 A | 8/1995 | Otsu et al. | |
| 5,619,589 A | 4/1997 | Otsu et al. | |
| 6,466,685 B1 | 10/2002 | Fukui et al. | |
| 6,546,115 B1 | 4/2003 | Ito et al. | |
| 6,985,620 B2 * | 1/2006 | Sawhney et al. | 382/154 |
| 7,245,771 B2 * | 7/2007 | Kaneko et al. | 382/233 |
| 7,440,588 B2 * | 10/2008 | Kaneko et al. | 382/103 |
| 7,522,186 B2 * | 4/2009 | Arpa et al. | 348/153 |
| 7,760,911 B2 * | 7/2010 | Xiao et al. | 382/107 |
| 2008/0123975 A1 | 5/2008 | Otsu et al. | |
| 2008/0187172 A1 | 8/2008 | Otsu et al. | |
| 2010/0021067 A1 | 1/2010 | Otsu et al. | |
| 2010/0166259 A1 | 7/2010 | Otsu et al. | |

FOREIGN PATENT DOCUMENTS

| | | |
|---|---|---|
| EP | 0 363 828 | 4/1990 |
| JP | 2-101586 | 4/1990 |
| JP | 2-101591 | 4/1990 |
| JP | 08-287258 | 11/1996 |

(Continued)

OTHER PUBLICATIONS

Owens et al., "Application of the Self-Organising Map to Trajectory Classification" 2000, IEEE, 1-7.

(Continued)

*Primary Examiner* — Bhavesh M Mehta
*Assistant Examiner* — Stephen R Koziol
(74) *Attorney, Agent, or Firm* — Nixon & Vanderhye, PC

(57) ABSTRACT

An abnormal action detector is provided for accurately detecting the position of an object together with an abnormal action using a cubic higher-order local auto-correlation feature. The abnormal action detector comprises a computer which generates inter-frame differential data from moving image data, extracts cubic higher-order local auto-correlation feature data on a pixel-by-pixel basis, adds the feature data for pixels within a predetermined range including each of pixels, calculates an index indicative of abnormality of the added feature data with respect to a subspace indicative of a normal action, determines an abnormality when the index is larger than a predetermined value, and outputs the position of a pixel at which the abnormality is determined. The computer further finds a subspace which exhibits a normal action from past feature data in accordance with a principal component analysis approach. The abnormal action detector is capable of determining abnormality on a pixel-by-pixel basis and correctly detecting the position of an object which has shown an abnormal action.

5 Claims, 10 Drawing Sheets

FOREIGN PATENT DOCUMENTS

| | | |
|---|---|---|
| JP | 08-329247 | 12/1996 |
| JP | 10-111930 | 4/1998 |
| JP | 2000-30065 | 1/2000 |
| JP | 2000-090277 | 3/2000 |
| JP | 2003-162718 | 6/2003 |
| JP | 2004-240762 | 8/2004 |
| JP | 2005-92346 | 4/2005 |
| JP | 2006-079272 * | 3/2006 |

OTHER PUBLICATIONS

Kobayashi et al., *Action and Simultaneous Multiple-Person Identification Using Cubic Higher-order Local Auto-Correlation*, Proceedings of the 17$^{th}$ International Conference on Pattern Recognition (ICPR '04), 2004.

Yamada et al., *Koji Kyokusho Jiko Sokan Tokucho to Hanbetsu Bunseki ni yoru Kao Gazo no. Hyojo Ninshiki*, ITE Technical Report, 2003, Nen 2 Gatu Kaisaibun (first volume), vol. 27, No. 8, The Institute of Image Information and Television Engineers, Feb. 3, 2003, pp. 145-148.

Otsu et al., U.S. Appl. No. 12/377,734, field Feb. 17, 2009.
Otsu et al., U.S. Appl. No. 12/304,552, filed Jun. 3, 2009.
Otsu et al., U.S. Appl. No. 11/792,084, filed Jan. 31, 2008.
Otsu et al., U.S. Appl. No. 11/662,366, filed Aug. 30, 2007.

* cited by examiner

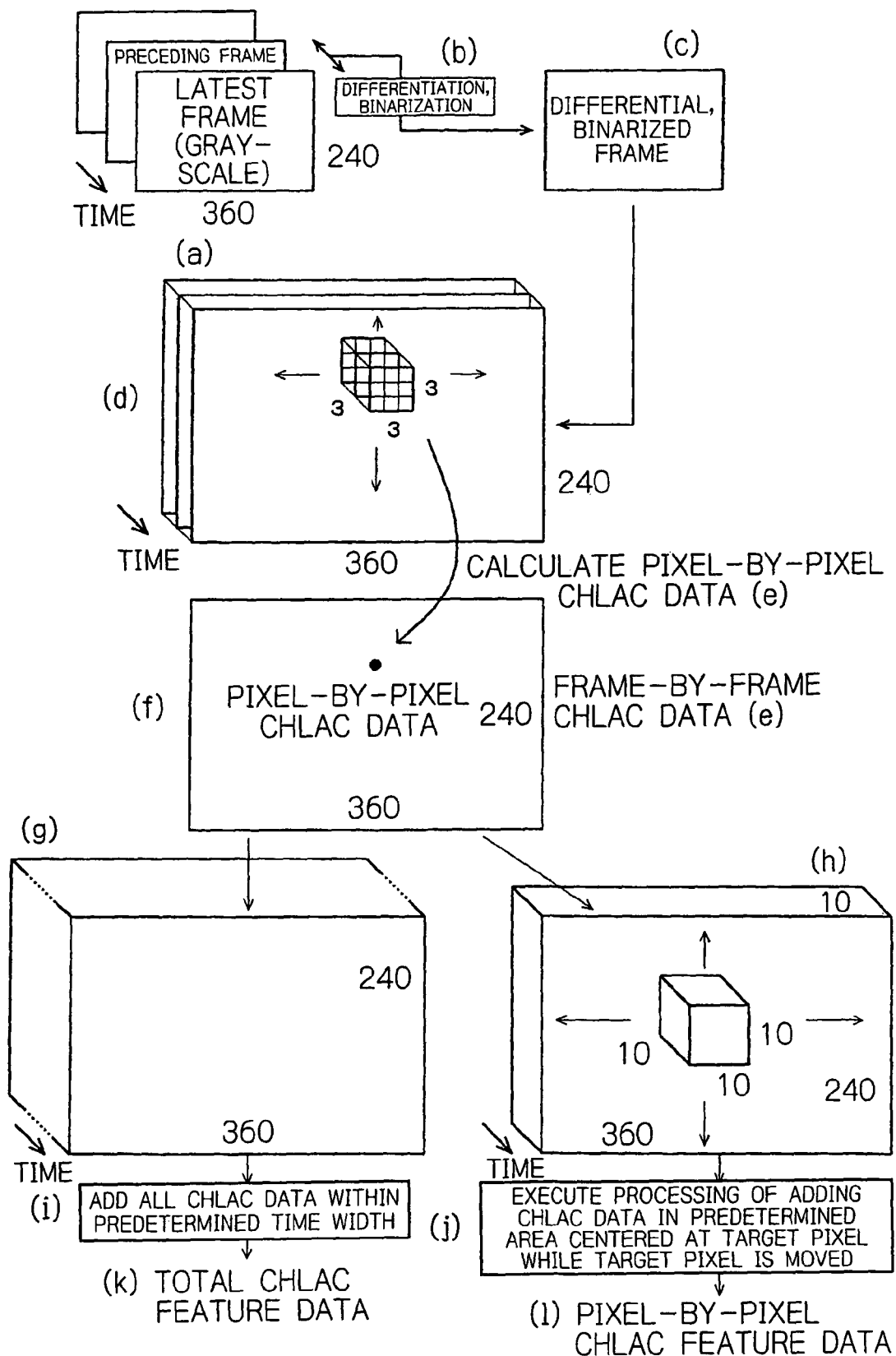

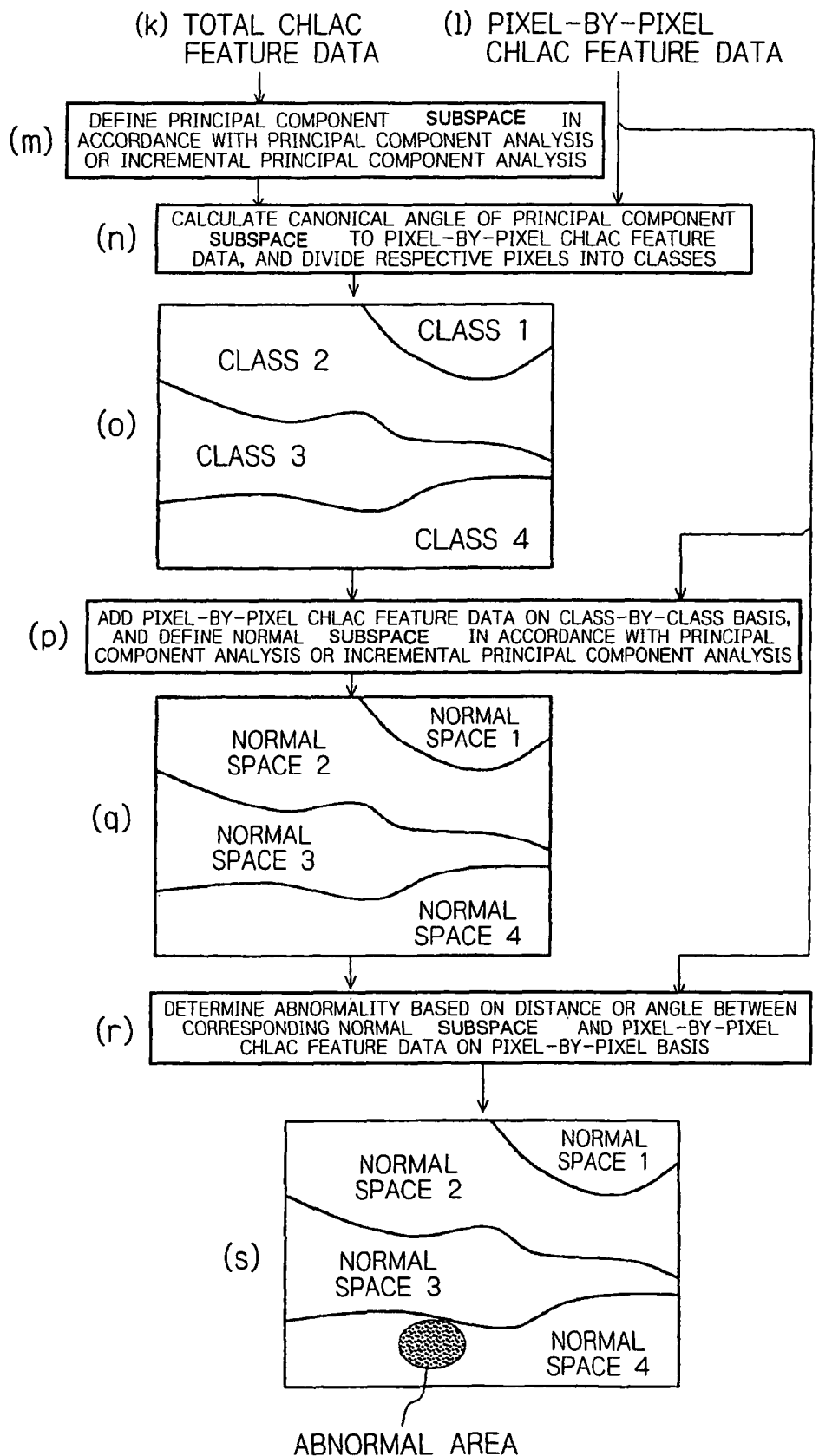

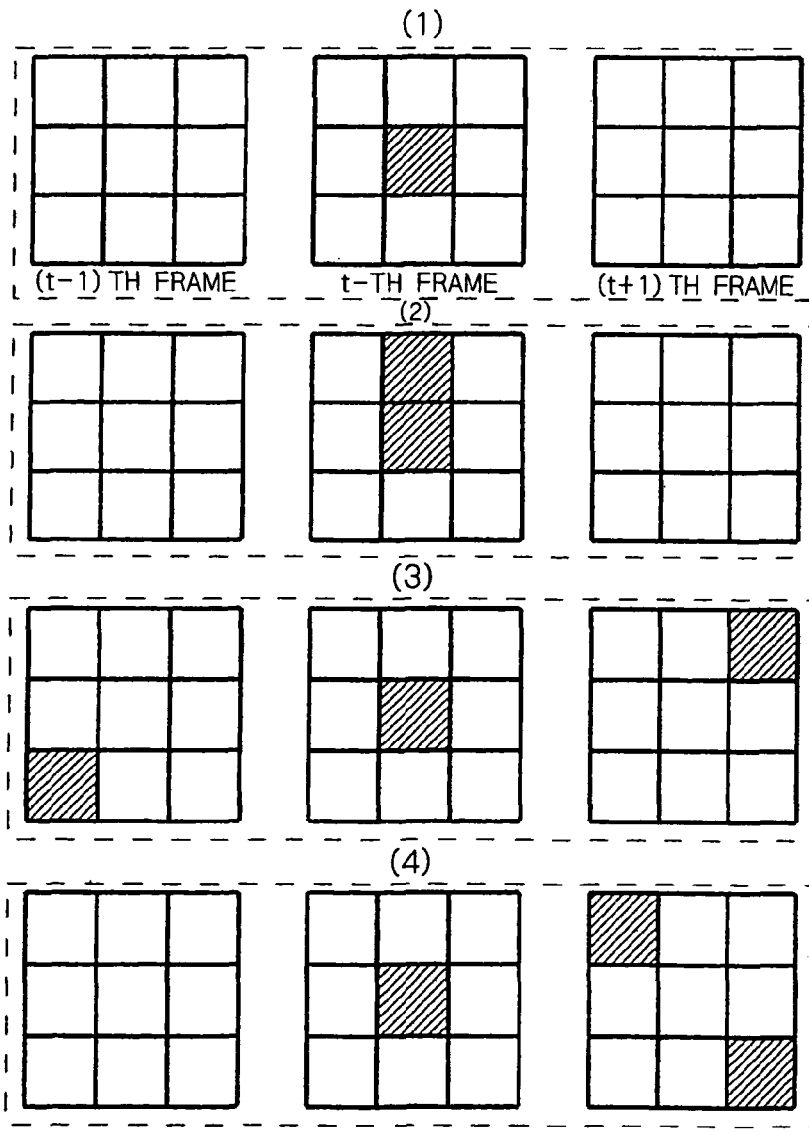

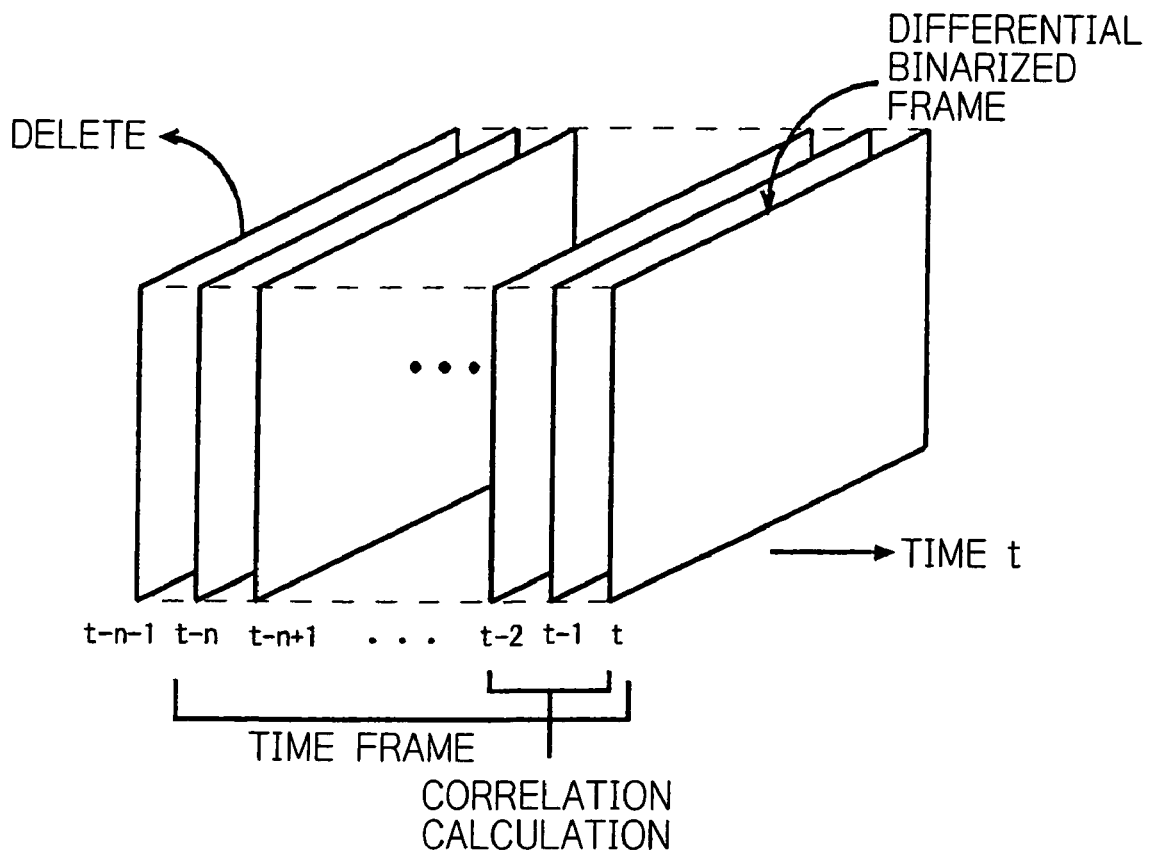

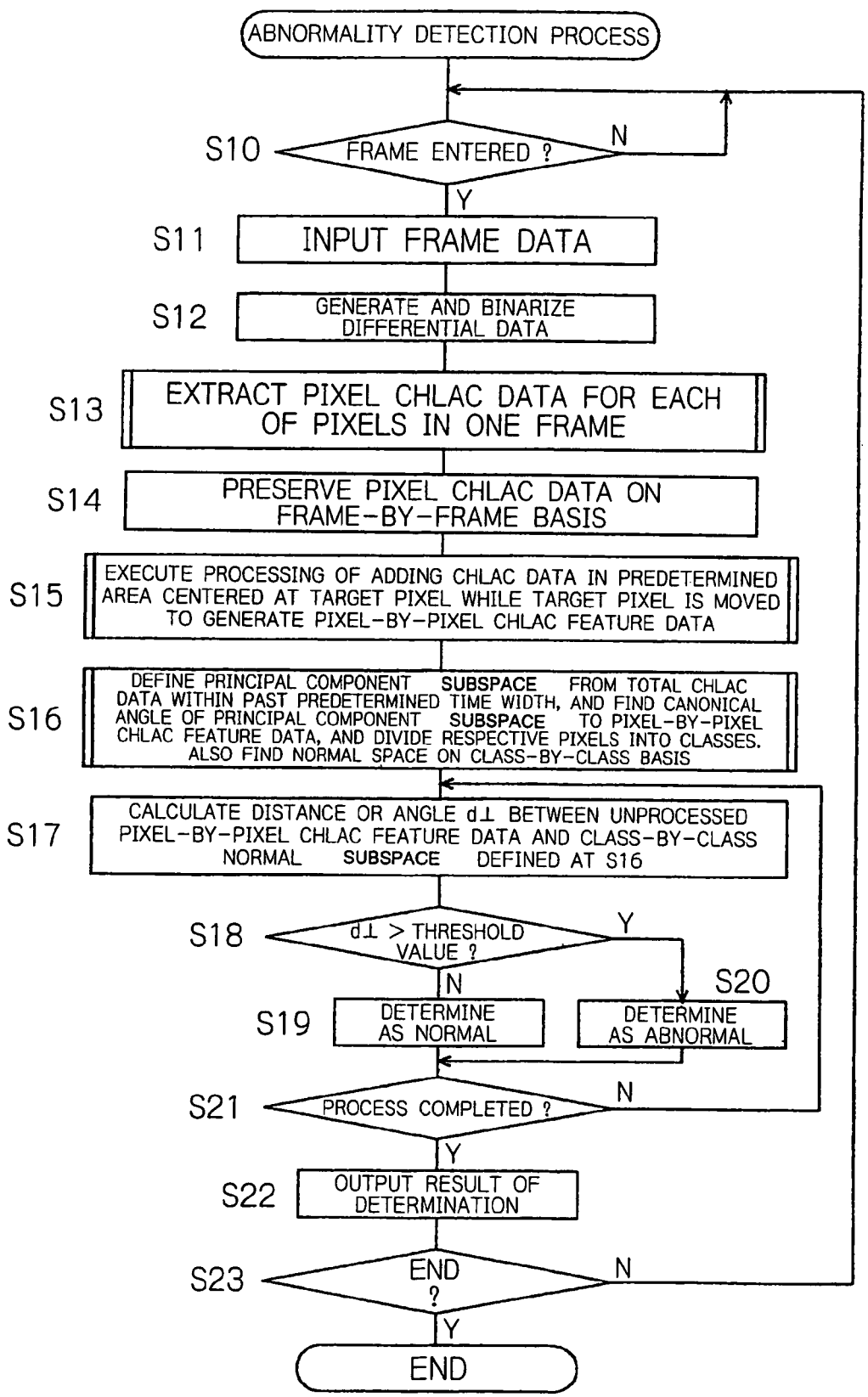

UNUSUAL ACTION DETECTOR AND ABNORMAL ACTION DETECTING METHOD

BACKGROUND OF THE INVENTION

1. Field of the Invention

The present invention relates to an abnormal (unusual) action detector and an abnormal action detecting method for capturing moving images to automatically detect actions different from usual.

2. Description of the Related Art

Currently, camera-based monitoring systems are often used in video monitoring in the field of security, an elderly care monitoring system, and the like. However, manual detection of abnormal actions from moving images requires much labor, and a computer substituted for the manual operation would lead to a significant reduction in labor. Also, in the elderly care, an automatic alarm system for accesses and the like, if any, would reduce a burden on care personnel, so that camera-based monitoring systems are required for informing abnormal actions and the like.

Thus, abnormal actions must be recognized from moving images to extract action features for an object. Studies on abnormal action recognition include, among others, Laid-open Japanese Patent Application No. 2006-079272 (Patent Document 1), filed by one of the inventors and one other, which discloses a technology for performing the abnormal action recognition using cubic higher-order local auto-correlation features (hereinafter called "CHLAC" feature data as well).

The conventional abnormal action recognition described above employs the cubic higher-order local auto-correlation features extracted from an entire screen, and the CHLAC data do not depend on the position, time and the like of the object and have values invariable in position, as action features. Taking advantage of the nature of additivity that when there are a plurality of objects in a cube, an overall feature value is the sum of individual feature values of the respective objects, normal actions available in abundance as normal data are statistically learned as a (linear) subspace, and abnormal actions are detected as deviations therefrom. In this way, when there are a plurality of persons, for example, on a screen, an abnormal action of even one person can be advantageously detected at high speeds without extraction or tracking of the individual persons.

However, the conventional abnormal action recognition has a problem of the inability to identify the position of an object which presents an abnormal action due to the position invariance of CHLAC data extracted from an entire screen. The conventional abnormal action recognition also has a problem of a lower detection accuracy when there are a plurality of types of objects per se, or abnormal actions.

SUMMARY OF THE INVENTION

It is an object of the present invention to provide an abnormal action detector and an abnormal action detecting method which are capable of solving the problems of the related art as described above and accurately detecting the position of an object together with an abnormal action using a cubic higher-order local auto-correlation features.

The abnormal action detector of the present invention comprises differential data generating means for generating inter-frame differential data from moving image data composed of a plurality of image frame data, feature data extracting means for extracting feature data from three-dimensional data comprised of the plurality of immediately adjacent inter-frame differential data on a pixel-by-pixel basis through cubic higher-order local auto-correlation, pixel-by-pixel feature data generating means for adding the feature data extracted by the feature data extracting means for pixels within a predetermined range including each of pixels spaced apart by a predetermined distance, index calculating means for calculating an index indicative of abnormality of feature data generated by the pixel-by-pixel feature data generating means with respect to a subspace of a normal action, abnormality determining means for determining an abnormality when the index is larger than a predetermined value, and outputting means for outputting the result of the determination which declares an abnormality for a pixel position for which the abnormality determining means determines an abnormality.

Also, characteristically, the abnormal action detector described above further comprises principal component subspace generating means for finding a subspace which exhibits a normal action based on a principal component vector from a plurality of feature data extracted by the feature vector extracting means in the past in accordance with a principal component analysis approach.

Further characteristically, the abnormal action detector described above further comprises a classifying means for finding an index of similarity based on a canonical angle of a subspace calculated from pixel-by-pixel feature data generated by the pixel-by-pixel feature data generating means to the subspace which exhibits a normal action, and classifying a screen on a pixel-by-pixel basis using a clustering approach, wherein the principal component subspace generating means adds the feature data on a class-by-class basis to calculate a class-by-class subspace, and the index calculating means calculates an index indicative of abnormality of the feature data generated by the pixel-by-pixel feature data generating means with respect to the class-by-class subspace.

Also characteristically, in the abnormal action detector described above, the index indicative of abnormality with respect to the subspace includes any of information on the distance between the feature data and the subspace and information on the angle of the feature data to the subspace.

In addition, in the abnormal action detector, the principal component subspace generating means generates a subspace based on a principal component vector in accordance with an incremental principal component analysis approach.

The abnormal action detecting method of the present invention comprises the steps of generating inter-frame differential data from moving image data composed of a plurality of image frame data, extracting feature data from three-dimensional data comprised of the plurality of immediately adjacent inter-frame differential data on a pixel-by-pixel basis through cubic higher-order local auto-correlation, adding the feature data for pixels within a predetermined range including each of pixels spaced apart by a predetermined distance, calculating an index indicative of abnormality of the feature data with respect to a subspace of a normal action, determining an abnormality when the index is larger than a predetermined value, and outputting the result of the determination which declares an abnormality for a pixel position at which an abnormality is determined.

The present invention provides the following advantages.

(1) Abnormalities can be determined on a pixel-by-pixel to correctly detect the position of an object which has performed an abnormal action.

(2) The existence of multiple objects has previously caused a reduction in abnormality detection accuracy, but provided that a predetermined range is appropriately selected about a pixel, even multiple objects under detection would not cause a reduction in abnormal action determination accuracy.

(3) Even a plurality of types of objects can be classified according to the position to further improve the accuracy. The classification may be previously performed or may be automatically updated simultaneously with the abnormality determination.

(4) A small amount of calculations is required for extracting features and determining abnormalities, and the amount of calculation is constant irrespective of the number of objects, so that real-time processing can be accomplished.

(5) Further, since normal actions are statistically learned without defining them as positive, no definition is required as to what normal actions are like at a designing stage, and a natural detection can be made in conformity to an object under monitoring. Further advantageously, since any assumption is not needed for an object under monitoring, a variety of objects under monitoring can be determined, not limited to actions of persons, whether they are normal or abnormal. Further advantageously, slow changes in normal actions can be tracked by capturing moving images in real time and updating the subspace of normal operations.

BRIEF DESCRIPTION OF THE DRAWINGS

FIG. 2 is an explanatory diagram (1) outlining an abnormal action detection process according to the present invention;

FIG. 3 is an explanatory diagram (2) outlining the abnormal action detection process according to the present invention;

FIG. 4 is explanatory diagram showing auto-correlation processing coordinates in a three-dimensional pixel space;

FIG. 5 is an explanatory diagram showing an exemplary auto-correlation mask pattern;

FIG. 6 is an explanatory diagram showing details of moving image real-time processing according to the present invention;

FIG. 7 is a flow chart illustrating details of an abnormal action detection process according to the present invention;

DETAILED DESCRIPTION OF THE PREFERRED EMBODIMENTS

Figure 1:
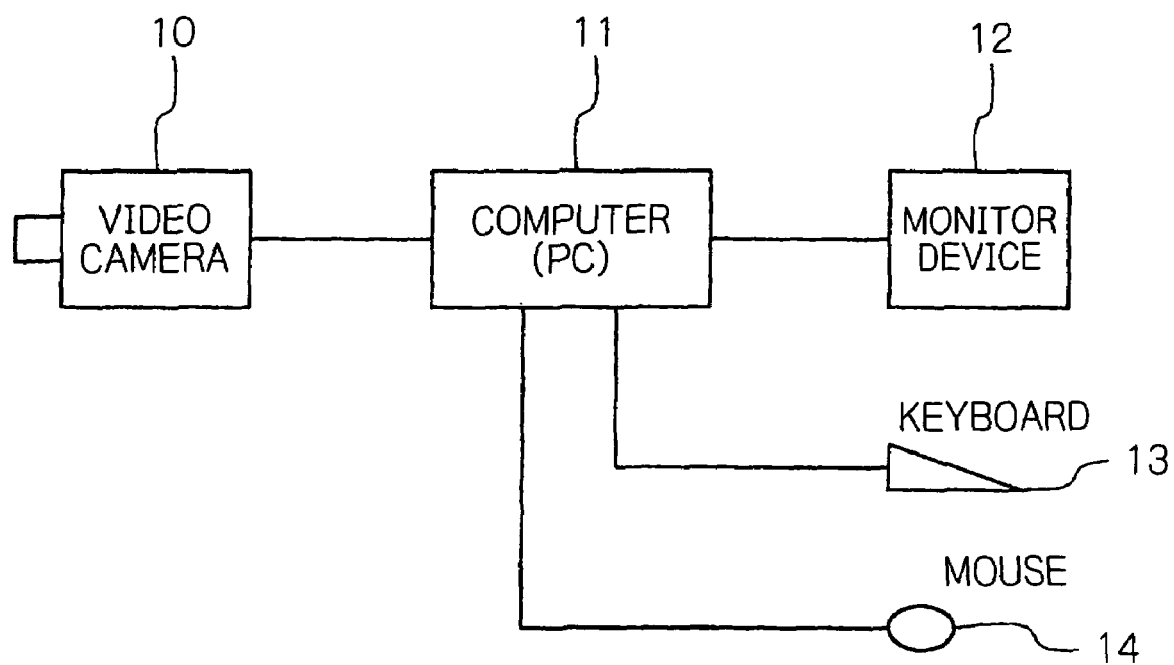
FIG. 1 is a block diagram illustrating the configuration of an abnormal action detector according to the present invention.

In this disclosure, abnormal actions are defined to be "those which do not belong to normal actions." When the normal actions refer to those actions which concentrate in a statistical distribution of action features, they can be learned from the statistical distribution. Thus, the abnormal actions refer to those actions which largely deviate from the distribution. In this way, abnormal actions need not be treated as positive even though they involve difficulties in previous definition and even sampling for learning. Such definition is advantageous in practical use as well.

For example, a security camera installed alongside a passage, a road or the like learns and recognizes general actions such as a walking action as normal actions, but recognizes suspicious actions as abnormal actions because they do not involve periodic motions such as the walking action and are hardly observed in distributions. In this connection, the inventors made experiments on the assumption that a "walking" action was regarded as normal, while a "running" action and a "falling" action as abnormal.

A specific approach for detecting abnormal actions involves generating a subspace of normal action features within an action feature space based on the cubic higher-order local auto-correlation features, and detecting abnormal actions using a distance from or an angle to the subspace as an index. A principal component analysis approach, for example, is used in the generation of the normal action subspace, where a principal component subspace comprises, for example, a principal component vector which presents a cumulative contribution ratio of 0.99.

Here, the cubic higher-order local auto-correlation features have the nature of not requiring the extraction of an object and exhibiting the additivity on a screen. Due to this additivity, in a defined normal action subspace, a feature vector falls within the normal action subspace irrespective of how many persons perform normal actions on a screen, but when even one of these persons performs an abnormal action, the feature vector extends beyond the subspace and can be detected as an abnormal value. Since persons need not be individually tracked and extracted for calculations, the amount of calculations is constant, not proportional to the number of intended persons, making it possible to make the calculations at high speeds.

Also, the present invention detects the position of an object by integrating CHLAC data within a predetermined area including (centered at) each of pixels spaced apart by a predetermined distance (an arbitrary value equal to or more than one) to find pixel-by-pixel CHLAC feature data, and relies on the distance between this data and the normal action subspace or the angle of the data to the normal action subspace to determine whether an action is normal or abnormal. This processing enables a determination to be made as to normal or abnormal on a pixel-by-pixel basis.

Further, pixel positions are divided into classes by a clustering approach using indexes based on a canonical angle between the subspace derived from the pixel-by-pixel CHLAC feature data and the normal action subspace. In this way, a sidewalk area on which persons are walking and a roadway area on which cars are running can be automatically divided, for example, form an image taken at an intersection for determining abnormal actions, thus further improving the determination accuracy.

FIG. 1 is a block diagram illustrating the configuration of an abnormal action detector according to the present invention. A video camera 10 outputs moving image frame data of an objective person or device in real time. The video camera 10 may be a monochrome or a color camera. A computer 11 may be, for example, a well known personal computer (PC) which comprises a video capture circuit for capturing moving images. The present invention is implemented by creating a program, later described, installing the program into the well-known arbitrary computer 11 such as a personal computer, and running the program thereon.

A monitoring device 12 is a known output device of the computer 11, and is used, for example, in order to display a detected abnormal action to an operator. A keyboard 13 and a mouse 14 are known input devices for use by the operator for entry. In the embodiment, moving image data entered, for example, from the video camera 10 may be processed in real time, or may be once preserved in an image file and then sequentially read therefrom for processing. In addition, the video camera 10 may be connected to the computer 11 through an arbitrary communication network.

FIGS. 2, 3 are explanatory diagrams which outline an abnormal action detection process according to the present invention. For example, the video camera 10 takes gray-scale (monochrome multi-value) moving images of 360×240 pixels, which are sequentially captured into the computer 11. The computer 11 calculates the absolute value of the difference in the luminance of the same pixel between the preceding frame and current frame from the captured frame data (a) to generate differential digital frame data (c) which takes "1" when the absolute value is equal to or larger than, for example, a predetermined threshold, and otherwise takes "0."

Next, pixel-by-pixel CHLAC data (f) is calculated from the three closest differential digital frame data (d) by a method, later described, and preserved in a frame-to-frame correspondence. Then, all CHLAC data (g) are added (i) over a past relatively long predetermined time width to produce total CHLAC feature data (k).

On the other hand, pixel-by-pixel CHLAC feature data (l) is produced by executing processing (j) of adding the pixel-by-pixel CHLAC data in a predetermined area (for example, ten pixels by ten pixels) centered at a target pixel while the target pixel is moved from the pixel-by-pixel CHLAC data (h) over the closest predetermined time width (for example, ten frames).

Turning to FIG. 3, principal component subspaces are defined from the total CHLAC feature data (k) and pixel-by-pixel CHLAC feature data (l), respectively, based on a principal component analysis or an incremental principal component analysis (m). Then, an index for similarity is found based on a conical angle between the two principal component subspaces, and respective pixels are divided (n) into classes using a clustering approach.

An explanatory diagram (o) illustrates the screen which is divided into a plurality of class areas, resulting from the classification on a pixel-by-pixel basis. In an experiment made by the inventors, a moving image of a road, for example, can be divided into a class of a sidewalk including motion features of pedestrians, a class of a roadway including motion features of cars, a class without changes, and the like.

Next, the pixel-by-pixel CHLAC feature data (l) are added on a class-by-class basis to find a normal subspace (p) by a principal component analysis or an incremental component analysis. Finally, abnormalities are determined (r) from the distance between a corresponding normal subspace and pixel-by-pixel CHLAC feature data on a pixel-by-pixel basis or from the angle of the normal subspace to the pixel-by-pixel CHLAC feature data. An explanatory diagram (s) illustrates that areas of pixels determined as abnormal are displayed, for example, in different colors, resulting from the abnormality determination based on the normal space on the pixel-by-pixel basis.

It should be noted that the present invention can also be practiced even without dividing the screen into classes on a pixel-by-pixel basis, in which case the processing illustrated in (n) and (p) are omitted, and the abnormality determination (r) is made based on the principal component subspace and pixel-by-pixel CHLAC feature data (l) defined by the processing illustrated in (m).

Alternatively, the present invention may previously or intermittently perform the definition of subspaces and classification for normal actions, and perform only the abnormality determination (r) while omitting the processing in (m), (n), (p) based on the resulting information on the subspaces and classifications of normal actions.

The following description will be focused on details of the foregoing processing. FIG. 7 is a flow chart illustrating details of an abnormal action detection process according to the present invention. At S10, the process waits until frame data has been completely entered from the video camera 10. At S11, the frame data is input (read into a memory). In this event, image data is, for example, gray scale data at 256 levels.

At S12, "motion" information is detected from moving image data, and differential data is generated for purposes of removing still images such as the background. For generating the differential data, the process employs an inter-frame differential scheme which extracts a change in luminance between pixels at the same position in two adjacent frames, but may alternatively employ an edge differential scheme which extracts portions of a frame in which the luminance changes, or may employ both schemes. When each pixel has RGB color data, the distance between two RGB color vectors may be calculated as differential data between two pixels.

Further, the data is binarized through automatic threshold selection in order to remove color information and noise irrelevant to the "motion." A method which can be employed for the binarization may be a constant threshold, a discriminant least-square automatic threshold method disclosed in Noriyuki Otsu, "Automatic Threshold Selection Based on Discriminant and Least-Squares Criteria," Transactions D of the Institute of Electronics, Information and Communication Engineers, J63-D-4, p 349-356, 1980 (Non-Patent Document 1), or a zero-threshold and noise processing scheme (a method which regards all portions other than those having no difference in a contrast image as having motions (=1), and removes noise by a known noise removing method).

The discrimination and least-square automatic thresholding method detects noise in a scene in which any object does not exist. Accordingly, when the threshold of the luminance differential value for binarization is smaller than a predetermined lower limit value, the lower limit value is used as the threshold. The foregoing pre-processing transforms the input moving image data into a sequence of frame data (c), each of which has a pixel value equal to a logical value "1" (with motion) or "0" (without motion).

At S13, the process extracts pixel CHLAC data (f) for each of pixels in one frame. As will be later described in greater detail, the process performs CHLAC extraction for generating 251-dimensional feature data. The cubic higher-order local auto-correlation (CHLAC) features are used for extracting action features from time-series binary differential data. N—the order CHLAC is expressed by the following Equation (1):

$$x_f^N(a_1, \ldots, a_N) = \int f(\gamma)f(\gamma+a_1)\ldots f(\gamma+a_N)d\gamma \quad \text{[Equation 1]}$$

where f represents a time-series pixel value (differential value), and a reference point (target pixel) r and N displacements $a_i$ (i=1, ..., N) viewed from the reference point make up a three-dimensional vector which also has a time as a component in two-dimensional coordinates within a differential frame. The frame CHLAC data at S13 is data which make up one frame on a pixel-by-pixel basis.

An infinite number of higher-order auto-correlation functions can be contemplated depending on displacement directions and an employed order number, and the higher-order local auto-correlation function refers to such a function which is limited to a local area. The cubic higher-order local auto-correlation features limit the displacement directions within a local area of 3×3×3 pixels centered at the reference point r, i.e., 26 pixels around the reference point r. In calculating a feature amount, an integrated value derived by Equation 1 for a set of displacement directions constitutes one feature amount. Therefore, feature amounts are generated as many as the number of combinations of the displacement directions (mask patterns).

The number of feature amounts, i.e, dimensions of feature vector is comparable to the types of mask patterns. With a binary image, one is derived by multiplying the pixel value "1" whichever number of times, so that terms of second and higher powers are deleted on the assumption that they are regarded as duplicates of a first-power term only with different multipliers. Also, in regard to the duplicated patterns resulting from the integration of Equation 1 (translation, i.e., scanning), a representative one is maintained, while the rest is deleted. The right side of Equation 1 necessarily contains the reference point (f(r), i.e., the center of the local area), so that a representative pattern to be selected should include the center point and be entirely fitted in the local area of 3×3×3 pixels.

As a result, there are a total of 352 types of mask patterns which include the center points, i.e., mask patterns with one selected pixel: one, mask patterns with two selected pixels: 26, and mask patterns with three selected pixels: 26×25/2=325. However, with the exclusion of duplicated mask patterns resulting from the integration in Equation 1 (translation, i.e., scanning), there is there are 251 types of mask patterns, i.e., a 251-dimensional cubic higher-order local auto-correlation feature vector for one three-dimensional data.

In a contrast image made up of multi-value pixels, for example, when a pixel value is represented by "a," a correlation value is a (zero–the order) ? axa (first order) ? axaxa (second order), so that duplicated patterns with different multipliers cannot be deleted even if they have the same selected pixels. Accordingly, two mask patterns are added to those associated with the binary image when one pixel is selected, and 26 mask patterns are added when two pixels are selected, so that there are a total of 279 types of mask patterns.

At S14, the pixel CHLAC data is preserved on a frame-by-frame basis. At S15, the pixel-by-pixel CHLAC feature data (j) is generated by executing the processing of adding pixel CHLAC data in a predetermined area centered at a target pixel while the target pixel is moved. The processing at S15 will be later described in greater detail.

At S16, the principal component spaces are defined (m) from the total CHLAC data (k) over a past predetermined time width and pixel-by-pixel CHLAC feature data (l), respectively, a canonical angle between the two principal component spaces is calculated, and the pixels are divided into classes (n). Further, a normal space is defined on a class-by-class basis (p). Details on S16 will be later described. At S17, the distance (or angle) d⊥ is calculated between unprocessed pixel-by-pixel CHLAC feature data and the class-by-class normal subspace, defined at S16.

Figure 11:
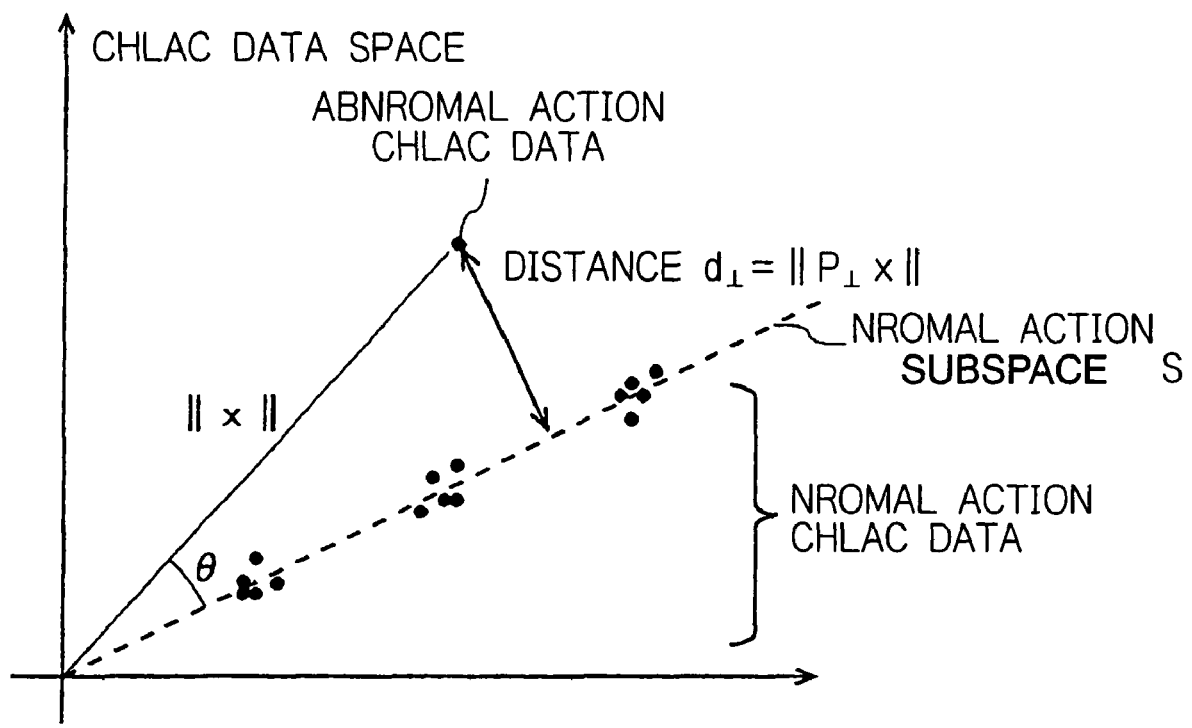
FIG. 11 is an explanatory diagram showing the nature of additivity and subspace of the CHLAC features.

FIG. 11 is an explanatory diagram showing the nature of the subspace of the CHLAC feature. For simplifying the description in FIG. 11, a CHLAC feature data space is two-dimensional (251-dimensions in actuality), and a subspace of normal actions is one-dimensional (in embodiments, around three to twelve dimensions with a cumulative contribution ratio being set equal to 0.99, by way of example), where CHLAC feature data of normal actions form groups of respective individuals under monitoring. A normal action subspace S found by a principal component analysis exists in the vicinity in such a form that it contains CHLAC feature data of normal actions. On the other hand, CHLAC feature data A of a deviating abnormal action presents a larger vertical distance d⊥ to the normal action subspace S. Accordingly, an abnormal action can be readily detected by measuring the vertical distance d⊥ between the CHLAC feature data and the subspace of the normal action.

The distance d⊥ is calculated in the following manner. A projector P to the normal subspace defined by a resulting principal component orthogonal base $U_k=[u_1, \ldots, u_k]$, and a projector P⊥ to an orthogonal auxiliary space to that are expressed by:

$$P = U_K U'_K \quad \text{[Equation 2]}$$

$$P_\perp = I_M - P \quad \text{[Equation 2]}$$

where U' is a transposed matrix of the matrix U, and $I_M$ is a M-th order unit matrix. A square distance in the orthogonal auxiliary space, i.e., a square distance $d^2\perp$ of a normal to the subspace U can be expressed by:

$$d_\perp^2 = \|P_\perp x\|^2 \quad \text{[Equation 3]}$$
$$= \|(I_M - U_K U'_K)x\|^2$$
$$= x'(I_M - U_K U'_K)'(I_M - U_K U'_K)x$$
$$= x'(I_M - U_K U'_K)x$$

In this embodiment, this vertical distance d⊥ is used as an index indicative of whether or not an action is normal.

However, the vertical distance d⊥ is an index which varies depending on the scale (norm of the feature vector). Therefore, the result of the determination can differ from one scale to another. Accordingly, another more scale robust index may be employed as shown below.

Consider first a scenario where the angle to a subspace S, i.e., sin θ is used as an index. This index, however, is not very appropriate because it presents a very large value even to a feature such as noise which has a very small scale. To cope with this inconvenience, this index is modified in the following manner such that the index presents a small value even when the scale is small:

$$d_\perp^\wedge = \frac{|P_\perp x|}{|x| + c} \quad \text{[Equation 4]}$$

where c is a positive constant. This index corrects an abnormality determination value for the scale, so that the index works out to be resistant to noise. This index means that the angle is measured from a point shifted from the origin by –c in the horizontal axis direction on the graph of FIG. 11.

At step S18, it is determined whether or not the vertical distance d⊥ is larger than a predetermined threshold. The process goes to S19 when the result of the determination is negative, whereas the process goes to S20 when affirmative. At S19, the pixel position is determined to represent a normal action. On the other hand, at S20, the pixel position is determined to represent an abnormal action.

At S21, it is determined whether or not the processing at S17 has been completed for all pixels. The flow goes to S17 when the result of the determination is negative, whereas the flow goes to S22 when affirmative. At S22, the result of the determination is output on a monitoring device or the like. At S23, it is determined whether or not the process is terminated, for example, by checking whether or not the operator has made some manipulation for terminating the process. The process returns to S10 when the result of the determination is negative, whereas the process is terminated when affirmative.

Figure 8:
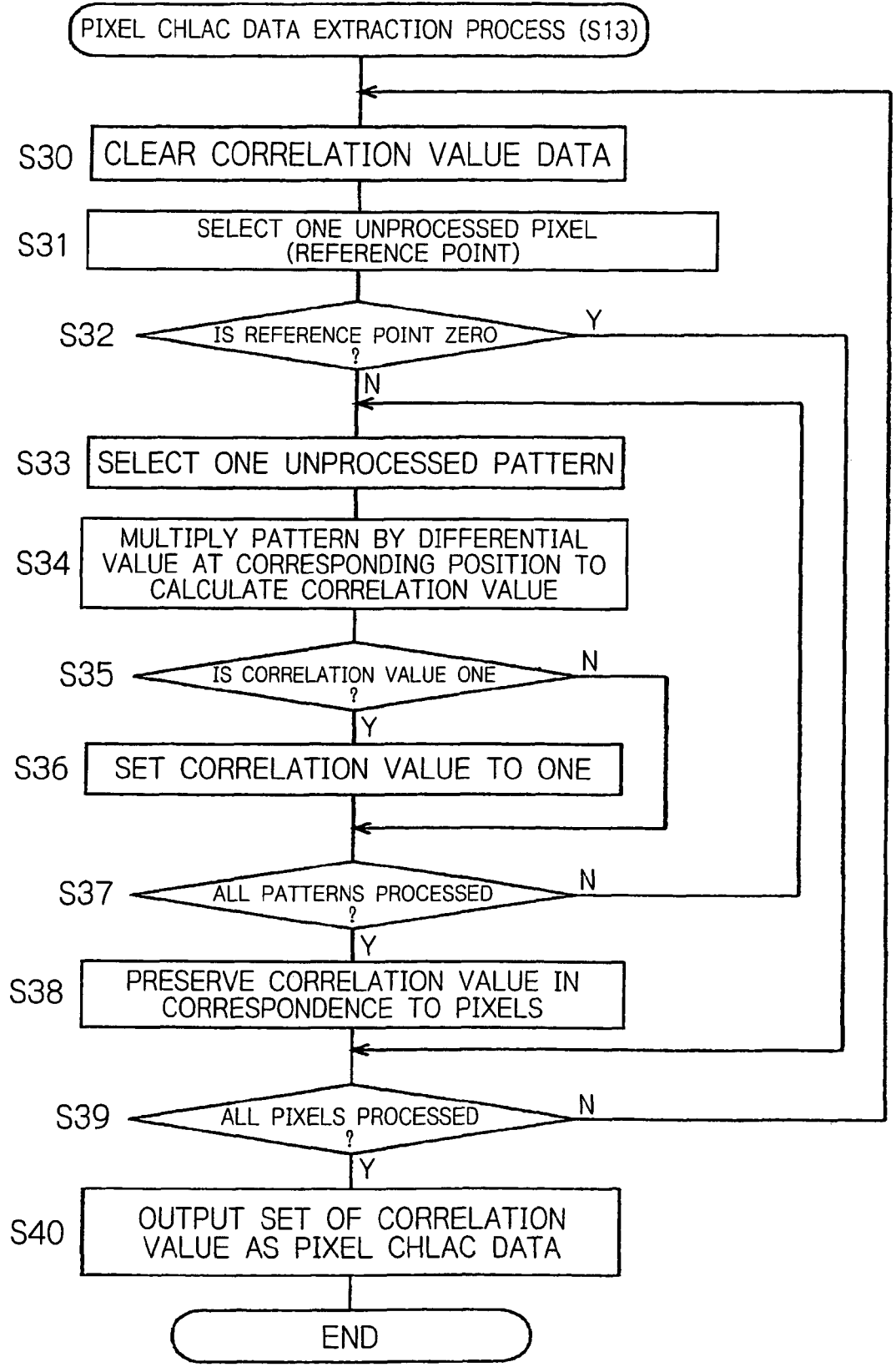
FIG. 8 is a flow chart illustrating details of a pixel CHLAC data extraction process.

FIG. 8 is a flow chart illustrating in detail the pixel CHLAC data extraction process at S13. At S30, correlation value data corresponding to 251 correlation patterns are cleared. At S31, one of unprocessed target pixels (reference points) is selected (by scanning the target pixels or reference points in order within a frame). At S32, it is determined whether or not a pixel value at the reference point is zero. The flow goes to step 33 when the result of the determination is negative, and goes to step S39 when affirmative. At S33, one of unprocessed mask patterns is selected.

FIG. 4 is an explanatory diagram showing auto-correlation processing coordinates in a three-dimensional pixel space. FIG. 4 shows xy-planes of three differential frames, i.e., (t−1) frame, t frame, (t+1) frame side by side. The present invention correlates pixels within a cube composed of 3×3×3 (=27) pixels centered at a target reference pixel. A mask pattern is information indicative of a combination of the pixels which are correlated. Data on pixels selected by the mask pattern is used to calculate a correlation value, whereas pixels not selected by the mask pattern are neglected. The target pixel (center pixel, i.e., reference point) is selected by the mask pattern without fail.

FIG. 5 is an explanatory diagram illustrating examples of auto-correlation mask patterns. FIG. 5(1) is the simplest zero-th order mask pattern which comprises only a target pixel. FIG. 5(2) is an exemplary first-order mask pattern for selecting two hatched pixels. FIGS. 5(3), 5(4) are exemplary third-order mask patterns for selecting three hatched pixels. Other than those, there are a multiplicity of patterns. Also, as mentioned above, there are 251 types of mask patterns except for duplicated patterns. In other words, there is a 251-dimensional cubic higher-order local auto-correlation feature vector for one three-dimensional data.

Turning back to FIG. 8, at S34, the correlation value is calculated using the aforementioned Equation 1 by multiplying a pattern by a differential value (0 or 1) at a corresponding position. This processing is comparable to the calculation of $f(r)f(r+a_1) \ldots f(r+a_N)$ in Equation 1.

At S35, it is determined whether or not the correlation value is one. The process goes to S36 when the result of the determination is affirmative, whereas the process goes to S37 when negative. At S36, the correlation value corresponding to the mask pattern is set to one. At S37, it is determined whether or not all mask patterns have been processed. The process goes to S38 when the result of the determination is affirmative, whereas the process goes to S33 when negative.

At S38, the correlation values are preserved in correspondence to pixels. At S39, it is determined whether or not all pixels have been processed. The process goes to S40 when the result of the determination is affirmative, whereas the process goes to S30 when negative. At S40, a set of pixel-by-pixel correlation values of one frame are output as pixel CHLAC data.

Figure 9:
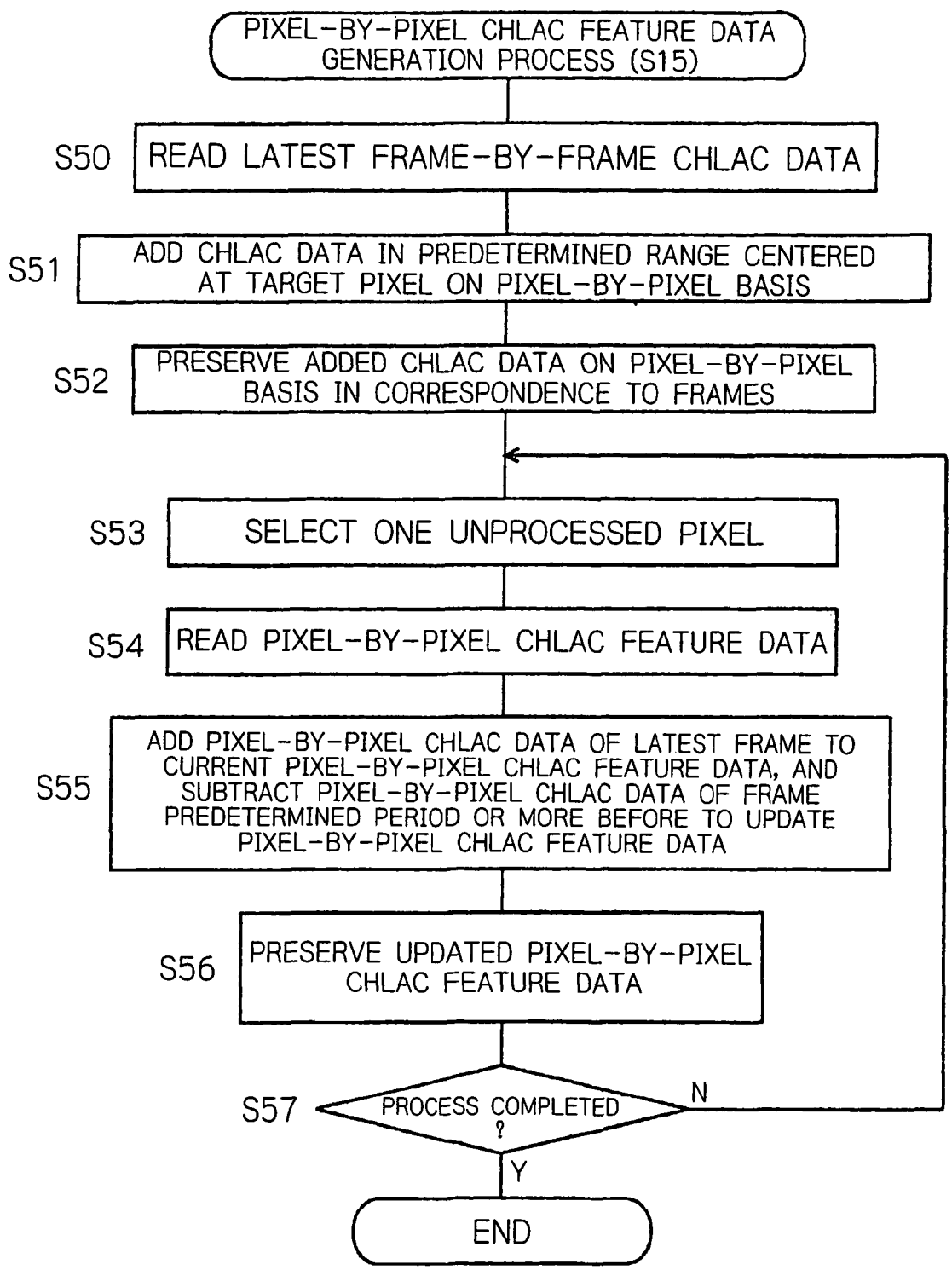
FIG. 9 is a flow chart illustrating details of a pixel-by-pixel CHLAC feature data generation process.

FIG. 9 is a flow chart illustrating details of the pixel-by-pixel CHLAC feature data generation process at S15. At S50, the latest frame-by-frame CHLAC data is read. At S51, CHLAC data in a predetermined range, for example, a range of 10×10×10 including (centered at) a target pixel are summed up on a pixel-by-pixel basis. For reference, this processing is comparable to the integration in Equation 1 above which involves adding correlation values one by one (adding the correlation values on a dimension-by-dimension basis) by moving (scanning) the target pixel over a desired range within the frame in the temporal direction. At S52, CHLAC feature data resulting from the addition of the correlation values on a pixel-by-pixel basis are preserved in correspondence to frames.

At S53, one of unprocessed pixel is selected. At S54, the pixel-by-pixel CHLAC feature data is read. At S55, the pixel-by-pixel CHLAC data of the latest frame is added to the current pixel-by-pixel CHLAC feature data, and the pixel-by-pixel CHLAC data of previous frames generated a predetermined period or more before is subtracted from the current pixel-by-pixel CHLAC feature data to update the pixel-by-pixel CHLAC feature data.

FIG. 6 is an explanatory diagram illustrating details of moving image real-time processing according to the present invention. Data of moving images are in the form of sequential frames. As such, a time window having a constant width is set in the temporal direction, and a set of frames within the window is designated as one three-dimensional data. Then, each time a new frame is entered, the time window is moved, and an obsolete frame is deleted to produce finite three-dimensional data. The length of the time window is preferably set to be equal to or longer than one period of an action which is to be recognized.

Actually, only one frame of the image frame data is preserved for taking a difference, and the frame CHLAC data corresponding to the frames are preserved only for the time window. Specifically, in FIG. 6, at the time a new frame is entered at time t, frame CHLAC data corresponding to the preceding time windows (t−1, t−n−1) have been already calculated. Notably, three immediately adjacent differential frames are required for calculating frame CHLAC data, but since a (t−1) frame is located at the end, the frame CHLAC data are calculated up to that corresponding to a (t−2) frame.

Thus, frame CHLAC data corresponding to the (t−1) frame is generated using newly entered t frames and added to the CHLAC data. Also, frame CHLAC data corresponding to the most obsolete (t−n−1) frame is subtracted from the CHLAC data. CHLAC feature data corresponding to the time window is updated through such processing.

Turning back to FIG. 9, at S56, the updated pixel-by-pixel CHLAC feature data is preserved. At S57, it is determined whether or not the processing has been completed for all pixels. The flow goes to S53 when the result of the determination is negative, whereas the process is terminated when affirmative.

Figure 10:
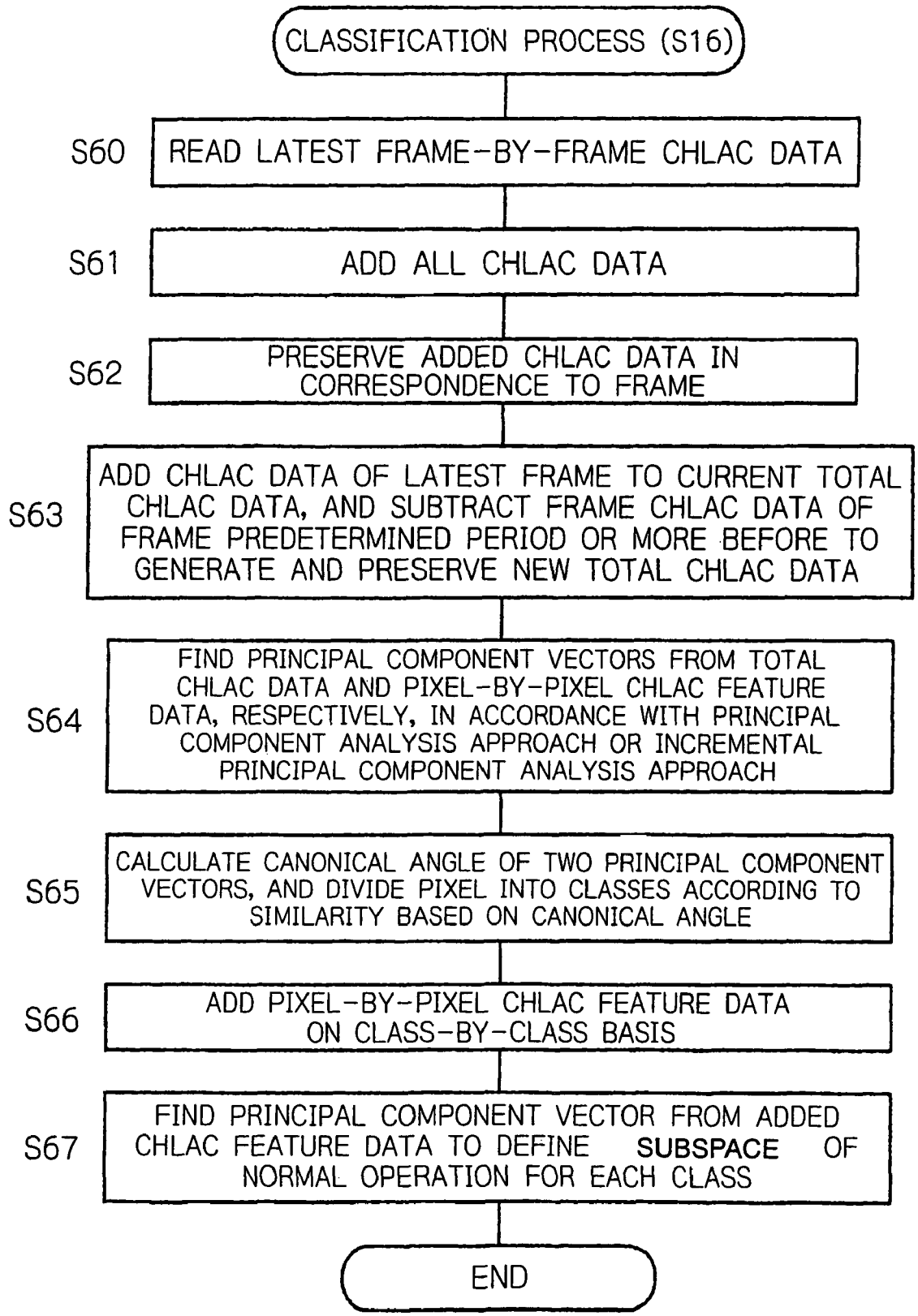
FIG. 10 is a flow chart illustrating details of a classification process.

FIG. 10 is a flow chart illustrating details of the classification processing at S16. At S60, the latest frame-by-frame CHLAC data is read. At S61, all the CHLAC data of this frame are added. At S62, the resulting sum of the CHLAC data is preserved in correspondence to the frame.

At S63, the CHLAC data of the most recent frame is added to all the current CHLAC data, and the frame-by-frame CHLAC data of previous frames generated a predetermined period or more before is read and subtracted from the current pixel-by-pixel CHLAC feature data to generate and preserve new total CHLAC data.

At S64, principal vector components are found from the total CHLAC data and pixel-by-pixel CHLAC feature data, respectively, by a principal component analysis approach or an incremental principal component analysis approach. The principal component analysis approach per se is well known and will therefore be described in brief. First, for defining the subspace of normal actions, principal component vectors are found from the total CHLAC feature data by a principal component analysis. An M-dimensional CHLAC feature vector x is expressed in the following manner:

$$x_i \in V^M (i=1, \ldots, N) \qquad \text{[Equation 5]}$$

where M=251. Also, the principal component vectors (eigenvectors) are arranged in a row to generate a matrix U expressed in the following manner:

$$U=[u_1, \ldots u_M] u_j \in V^M (j=1, \ldots, M) \qquad \text{[Equation 6]}$$

where M=251. The matrix U which has the principal component vectors arranged in a row is derived in the following manner. An auto-correlation matrix Rx is expressed by the following equation:

$$R_x = \frac{1}{N}\sum_{i=1}^{N}\{x_i x_i^T\} \qquad \text{[Equation 7]}$$

The matrix U is derived from an eigenvalue problem expressed by the following equation using the auto-correlation matrix Rx.

$$R_x U = U\Lambda \qquad \text{[Equation 8]}$$

An eigenvalue matrix Λ is expressed by the following equation:

$$\Lambda = \text{diag}(\lambda_1, \ldots, \lambda_M) \qquad \text{[Equation 9]}$$

A cumulative contribution ratio $\alpha_k$ up to a K-th eigenvalue is expressed in the following manner:

$$\eta_K = \frac{\sum_{i=1}^{K}\lambda_i}{\sum_{i=1}^{M}\lambda_i} \qquad \text{[Equation 10]}$$

Now, a space defined by eigenvectors $u_1, \ldots, u_k$ up to a dimension in which the cumulative contribution ratio $\alpha_k$ reaches a predetermined value (for example, $\alpha_k$=0.99) is applied as the subspace of normal actions. It should be noted that an optimal value for the cumulative contribution ratio $\alpha_k$ is determined by an experiment or the like because it may depend on an object under monitoring and a detection accuracy. The subspace of normal actions is generated by performing the foregoing calculations.

Next, a description will be given of the incremental principal component analysis approach which incrementally finds subspaces without solving an eigenvalue problem or finding a covariance matrix. Since a large amount of data is treated in applications to the real world, it is difficult to keep all data stored. As such, subspaces of normal actions are incrementally learned and updated.

An approach considered suitable for the incremental principal component analysis may first solve an eigenvalue problem at each step. An auto-correlation matrix Rx required for the eigenvalue problem is updated in the following manner.

$$Rx(n) = \frac{n-1}{n}Rx(n-1) + \frac{1}{n}x(n)x(n)^T \qquad \text{[Equation 11]}$$

where Rx(n) is an auto-correlation matrix at an n-th step, and x(n) is an input vector at the n-th step. Though faithful to the principal component analysis approach described above, the incremental principal component analysis has a disadvantage of a large amount of calculations because the eigenvalue problem must be solved at each step. Thus, CCIPCA is applied. This is an approach for incrementally updating an eigenvector without solving the eigenvalue problem or finding a correlation matrix. Details of CCIPCA is disclosed in Juyang Weng, Yilu Zhang and Wey-Shiuan Hwang, "Candid Covariance-Free Incremental Principal Component Analysis," IEEE Transactions on Pattern Analysis and Machine Intelligence, Vol. 25, No. 8, pp. 1034-1040, 2003.

This algorithm is a very fast approach because it need not solve the eigenvalue problem at each step. Also, in this approach, while the eigenvalue does not so well converge, the eigenvector characteristically converges fast. A first eigenvector and a first eigenvalue are updated in the following manner:

$$v(n) = \frac{n-1}{n}v(n-1) + \frac{1}{n}x(n)x(n)^T\frac{v(n-1)}{|v(n-1)|} \qquad \text{[Equation 12]}$$

where the eigenvector is represented by v/∥v∥, and the eigenvalue by ∥v∥. In this update rule, it has been proved that $v(n) \to \pm\lambda_1 e_1$ when n is infinite, where $\lambda_1$ is a maximum eigenvalue of the correlation matrix R of a sample, and $e_1$ is an eigenvector corresponding thereto. It has been shown that an n-th eigenvector and an n-th eigenvalue are gradually updated in conformity to Gram-Schmidt's orthogonalization from the first eigenvector and first eigenvalue, and converge to a true eigenvalue and eigenvector, respectively. An updating algorithm is shown below in detail.

K principal eigenvectors $v_1(n), \ldots, v_k(n)$ are calculated from x(n). The following processing is performed for n=1, 2, . . . :
  1. U1(n)=x(n), and
  2. the following processing is performed up to i=1, 2, . . . min(k,n):
     (a) if i=n, an i-th vector is initialized to $v_i(n)=u_i(n)$; and
     (b) otherwise, the following processing is performed:

$$v(n) = \frac{n-1}{n}v_i(n-1) + \frac{1}{n}u_i(n)u_i^T(n)\frac{v(n-1)}{|v(n-1)|} \qquad \text{[Equation 13]}$$

$$u_{i+1}(n) = u_i(n) - u_i^T(n)\frac{v_i(n)}{|v_i(n)|}\frac{v_i(n)}{|v_i(n)|}$$

The present invention determines an upper limit value, rather than finding M, which is the number of all dimensions, for an eigenvector which is intended by CCIPCA to solve. While solving an eigenvalue problem involves finding eigenvalues before finding a cumulative contribution ratio, and taking dimensions until the cumulative contribution ratio exceeds, for example, 0.99999, CCIPCA defines the upper limit value for the following two reasons. First, the conventional method requires a large amount of calculations. All eigenvalues must be estimated for finding the contribution ratio, and a personal computer requires a time of as long as several tens of seconds for calculations in estimating all eigenvalues even excluding a calculation time for extracting features. On the other hand, when the number of dimensions is limited to a constant value, for example, four in the foregoing calculations, a personal computer can carry out the calculations in several milliseconds, i.e., a processing time acceptable for real-time processing.

A second reason is that the eigenvalue slowly converges in the CCIPCA approach. When the CCIPCA approach is employed for a number of data included in several thousands of frames, subspaces of normal actions will eventually have approximately 200 dimensions and do not at all converge to four which is the defined value to which the number of dimensions should converge. For these reasons, the dimension of the subspaces is defined as constant. An approximate value for this parameter can be found by once solving an eigenvalue problem for an input vector which extends over a certain time width.

At S65, a canonical angle is calculated for the two principal component vectors found at S64, and pixels are classified according to a similarity based on the canonical angle. The canonical angle means the angle formed by two subspaces in the statistics, and N (=M) canonical angles can be defined between an M-dimensional subspace and an N-dimensional subspace. A second canonical angle $\theta_2$ is a minimum angle measured in a direction orthogonal to a minimum canonical angle $\theta_1$. Likewise, a third canonical angle $\theta_3$ is a minimum angle measured in a direction orthogonal to $\theta_1$ and $\theta_2$. An F×F projection matrix is shown below:

$$P_1 = \sum_{i=1}^{M} \Phi_i \Phi_i^T, \; P_2 = \sum_{i=1}^{N} \Psi_i \Psi_i^T \qquad \text{[Equation 14]}$$

which is calculated from base vectors $\Phi_i$, $\Psi_i$ of subspaces L1 and L2 in an F-dimensional feature space.

The i-th largest eigenvalue $\lambda_i$ of P1P2 or P2P1 is $\cos^2\theta_i$. The relationship between the M-dimensional subspace $L_1$ and N-dimensional subspace $L_2$ are completely defined by N canonical angles. When the two subspaces completely match with each other, the N canonical angles are all zero. As the two subspaces moves away from each other, lower canonical angles increase, and all the canonical angles reach 90 degrees when the two subspaces are completely orthogonal to each other. In this way, a plurality of canonical angles represents a structural similarity of two subspaces. Bearing this in mind, n (=N) canonical angles are used to define a similarity S[n] in the following manner, and the defined similarity S[n] is used as an index:

$$S[n] = \frac{1}{n}\sum_{i=1}^{n} \cos^2\theta_i \qquad \text{[Equation 15]}$$

Next, index values found based on the similarity of the canonical angles are clustered using a Mean Shift method. Details of the Mean Shift method are disclosed in Dorin Comaniciu and Peter Meer, "Mean shift: A robust approach toward feature space analysis," IEEE Transactions on Pattern Analysis and Machine Intelligence, Vol. 24, No. 5, pp. 603-619, 2002. The Mean Shift method is a clustering approach which does not give the number of classes, and must set a scale parameter for defining the degree of vicinity. In this embodiment, since the index is the similarity of the canonical angles which simply has a value between zero and one, and therefore the scale itself does not much vary depending on scenes, the scale parameter is set at approximately 0.1.

At S66, the pixel-by-pixel CHLAC feature data are added on a class-by-class basis. At S67, a principal component vector is found on a class-by-class basis from the added CHLAC feature data using the principal component analysis approach or incremental principal component analysis approach as mentioned above. The resulting principal component vector represents a subspace of normal action in each class.

While the embodiment has been described in connection with the detection of abnormal actions, the following variations can be contemplated in the present invention by way of example. While the embodiment has disclosed an example in which abnormal actions are detected while updating the subspace of normal actions, the subspace of the normal actions may have been previously generated by a learning phase, or the subspace of normal actions may be generated and updated at a predetermined period longer than a frame interval, for example, at intervals of one minute, one hour or one day, such that a fixed subspace may be used to detect abnormal actions until the next update. In this way, the amount of processing is further reduced.

While the foregoing embodiment has disclosed an example of generating feature data on a pixel-by-pixel basis, the feature data are more similar at positions closer to each other. Accordingly, when the process illustrated in FIG. 9, for example, is performed for each of those pixels which are spaced apart from one another by a predetermined distance, a processing load can be reduced to increase the speed of operation. However, since there is a trade-of between this method and challenges such as pinpointing of location or detection accuracy, appropriate settings are required for a particular situation.

When a subspace can be generated for each of a plurality of normal action patterns, a plurality of abnormality determinations may be made using the respective partial places, and the results of the plurality of determinations are logically ANDed to determine an abnormality when all patterns are determined as abnormal.

While the embodiment has disclosed an example of dividing a space into classes, the clustering may be performed not only in space but also in a temporal direction. With the clustering in the temporal direction, the present invention can also be applied to scenes of a place such as a station and a street where the crowdedness differs in the morning and afternoon, or a place such as a pedestrian crossing where the crowdedness varies temporally as well as spatially. Further, since actions can be adaptively learned in a temporal aspect as well, the abnormal action detector can gradually learn actions following changes in movements of a camera of a robot or the like, instead of a stationary camera, such as an adaptive background estimation.

While the embodiment has disclosed an example in which each pixel is characterized by the sum of CHLAC within a neighboring area centered thereat, the screen may be divided into fixed neighboring areas (for example, in tessellation) such that abnormality is detection in each of the areas (when the distance between the range of vicinity and a sampled pixel is equal). Also, while the embodiment has disclosed an example of detecting abnormalities from the overall screen, abnormalities may be detected only in an arbitrarily shaped area in accordance with the configuration of a scene (screen). For example, abnormalities may be detected only in a roadway area in a classified screen. A processing load is reduced by limiting the abnormality detection process only to an area which should be monitored.

What is claimed is:

1. An unusual action detector comprising:
    differential data generating means for generating inter-frame differential data from moving image data comprised of image frame data;
    feature data extracting means for extracting feature data from three-dimensional data comprised of immediately adjacent inter-frame differential data on a pixel-by-pixel basis through cubic higher-order local auto-correlation;
    pixel-by-pixel feature data generating means for adding the extracted feature data for pixels within a predetermined range including each of pixels spaced apart by a predetermined distance;
    index calculating means for calculating an index indicative of unusualness of feature data generated by said pixel-by-pixel feature data generating means with respect to a subspace of a usual action;

unusualness determining means for determining unusualness when the index is larger than a predetermined value; and outputting means for outputting the result of the determination which declares unusualness for a pixel position for which said unusualness determining means determines unusualness;

the unusual action detector further comprising:

principal component subspace generating means for finding the subspace which exhibits the usual action based on a principal component vector from extracted feature data in the past in accordance with a principal component analysis approach; and a classifying means for finding an index of similarity based on a canonical angle of a subspace found from pixel-by-pixel feature data generated by said pixel-by-pixel feature data generating means to the subspace which exhibits the usual action, and classifying a screen on a pixel-by-pixel basis using a clustering approach, wherein said principal component subspace generating means adds the feature data on a class-by-class basis to calculate a class-by-class subspace, and said index calculating means calculates an index indicative of unusualness of the feature data generated by said pixel-by-pixel feature data generating means with respect to the class-by-class subspace.

2. The unusual action detector according to claim 1, wherein said index indicative of unusualness with respect to the subspace includes any of information on the distance between the feature data and the subspace and information on an angle of the feature data to the subspace.

3. The unusual action detector according to claim 1, wherein said principal component subspace generating means generates a subspace based on a principal component vector in accordance with an incremental principal component analysis approach.

4. An unusual action detecting method comprising:

generating inter-frame differential data from moving image data comprised of image frame data;

extracting feature data from three-dimensional data comprised of immediately adjacent inter-frame differential data on a pixel-by-pixel basis through cubic higher-order local correlation;

adding the feature data for pixels within a predetermined range including each of pixels spaced apart by a predetermined distance;

calculating an index indicative of unusualness of the feature data with respect to a subspace of a usual action;

determining unusualness when the index is larger than a predetermined value; and outputting the result of the determination which declares unusualness for a pixel position at which unusualness is determined;

the method further comprising:

finding the subspace which exhibits the usual action based on a principal component vector from extracted feature data in the past in accordance with a principal component analysis approach; and finding an index of similarity based on a canonical angle of a subspace found from pixel-by-pixel feature data to the subspace which exhibits the usual action, and classifying a screen on a pixel-by-pixel basis using a clustering approach, wherein the feature data is added on a class-by-class basis to calculate a class-by-class subspace, and wherein an index indicative of unusualness of the feature data is calculated with respect to the class-by-class subspace.

5. An unusual action detector receiving moving image data from a camera, the unusual action detector comprising a computer configured to:

generate inter-frame differential data from the moving image data, the moving image data comprising image frames;

extract feature data from three-dimensional data comprised of immediately adjacent inter-frame differential data on a pixel-by-pixel basis through cubic higher-order local correlation;

add the feature data for pixels within a predetermined range including each of pixels spaced apart by a predetermined distance;

calculate an index indicative of unusualness of the feature data with respect to a subspace of a usual action;

determining unusualness when the index is larger than a predetermined value; and outputting the result of the determination which declares unusualness for a pixel position at which unusualness is determined, the computer being further configured to:

find the subspace which exhibits the usual action based on a principal component vector from extracted feature data in the past in accordance with a principal component analysis approach; and find an index of similarity based on a canonical angle of a subspace found from pixel-by-pixel feature data to the subspace which exhibits the usual action, and classifying a screen on a pixel-by-pixel basis using a clustering approach, wherein the feature data is added on a class-by-class basis to calculate a class-by-class subspace, and wherein an index indicative of unusualness of the feature data is calculated with respect to the class-by-class subspace.

* * * * *